Dec. 15, 1931. F. W. OBENHAUS ET AL Re. 18,289

SYSTEM OF HEAT CONTROL

Original Filed Jan. 30, 1922 2 Sheets-Sheet 1

INVENTORS:
FRANCIS W. OBENHAUS
GEORGE R. ROOMS
BY Fred W. Lewis
ATTORNEY.

Dec. 15, 1931. F. W. OBENHAUS ET AL Re. 18,289

SYSTEM OF HEAT CONTROL

Original Filed Jan. 30, 1922 2 Sheets-Sheet 2

INVENTORS.
FRANCIS W. OBENHAUS
GEORGE R. ADAMS
BY Fred W. Lamie
ATTORNEY.

Reissued Dec. 15, 1931

Re. 18,289

UNITED STATES PATENT OFFICE

FRANCIS W. OBENHAUS, OF GLENDALE, AND GEORGE R. ADAMS, OF LOS ANGELES, CALIFORNIA, ASSIGNORS, BY MESNE ASSIGNMENTS, TO GAS FURNACE CONTROL CO., A CORPORATION OF CALIFORNIA

SYSTEM OF HEAT CONTROL

Original No. 1,591,228, dated July 6, 1926, Serial No. 532,927, filed January 30, 1922. Application for reissue filed April 18, 1927. Serial No. 184,780.

Our invention relates to heating systems and is particularly applicable to systems used to heat residences, stores or other buildings.

The principal object of our invention is to provide means for controlling a gas heater used in such heating and to provide means for so controlling the gas heater that several degrees of heat may be obtained therefrom.

A still further object of the invention is to effect this control from a point remote from the heater and to provide indicating means remote from the heater for indicating the exact condition of the fire in that heater at any moment.

In addition to the general system of control by which the degrees of heat in the heater may be controlled and indicated, our invention embodies a novel form of valve for accomplishing these objects and a novel form of push button switch, all of which will be described hereinafter.

Referring to the drawings, which are for illustrative purposes only.

Figure 1:
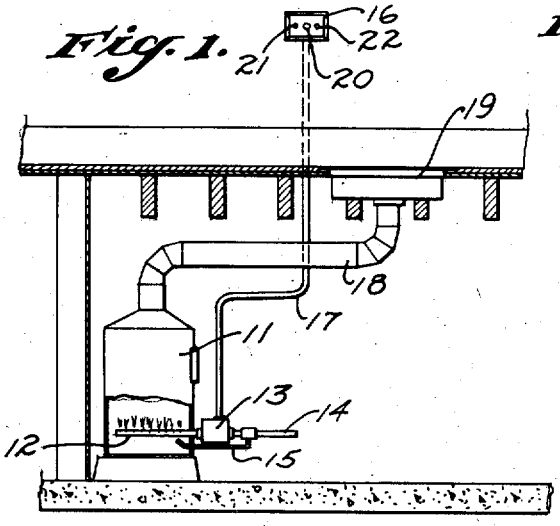
Fig. 1 is a section through a portion of a residence equipped with apparatus embodying our invention.

Our invention may be applied to any sort of heating, but it is particularly applicable to store and residence heating, and in Fig. 1 we show a gas heater applied to such use.

In this drawing, 11 is a heater having a burner 12 which is supplied with gas through a valve 13 from a gas supply pipe 14. A pilot pipe 15 supplies a pilot burner independent of the valve 13. The operation of the valve 13 is controlled from a push button switch 16, wires being run through conduits 17 from the push button switch 16 to the valve 13. The heater is provided with a pipe 18 delivering hot air through a register 19 to an upper floor of the building.

It will be noted that the push button switch 16 is situated at a point remote from the heater. By the term "remote from the heater," we are to be understood to mean a point sufficiently far away from the heater so that the heater can not be seen by the person operating the control. The push button switch 16 contains a push button 20, a "high" light 21, and a "low" light 22. In practical operation, in the employment of the invention, shown, the operation of the heater is controlled wholly by the push button switch 16. If, for example, the main burner is extinguished, and the pilot flame only is burning, the heater may be said to be in the "off" position. If it is desired to start the heater, the push button 20 is actuated and the valve means 13 is operated a small amount allowing a low flame. The fact that only the low flame is burning is indicated by the "low" light 22. By suitable manipulation of the switch, as will hereinafter be explained, the valve means 13 can either be returned to the "off" position or to the "intermediate" position or to a "high" position, all of which will be readily indicated by the "high" and "low" lights 21 and 22, as will hereinafter be described.

Considered broadly, our invention comprises a system of multiple control, above described. That is to say, a system by which an operator at a remote point can not only turn the gas off and on, but can also provide several degrees of intensity of the flame from this remote point. The method of accomplishing these results will be understood from the following description of the apparatus and its method of operation.

The push button switch 16 is shown in detail in Figs. 3, 4, 5 and 6 and consists of a block of insulating material 30 which is secured to a face plate 31 by means of screws 32. The face plate 31 is a standard flush-switch face plate which is so arranged that the insulating block 30 readily fits in the standard wall receptacles now in common use throughout the United States. Secured in cavities in the block 30 are four clips 33 which are of proper shape to take a telephone lamp 34, the filament 35 and tip 36 of this lamp projecting through the face plate 31 so that they are readily visible and are also well protected from mechanical injury. There are two of these lamps 34 numbered 21 and 22 in the previous description. Situated between the clips 33 are a pair of clips 37 which are adapted to be connected together by a moving contact 38 carried on the push button 20, the push button being held against the plate 31 by means of a spring 39. When the push button 20 is pushed upwardly the contact 38 completes the circuit between the contacts 37. One of the contacts 37 is connected by means of a single bar 40 with two of the contacts 33.

It may be stated that this particular form of push button switch has only been developed by us after a great deal of experimental and research work, and that we consider the switch an invention in itself.

Figure 10:
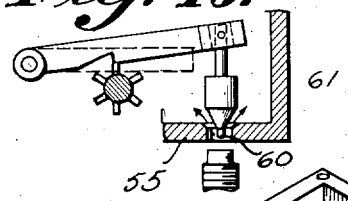
Fig. 10 is a diagram of the valve mechanism.
Figure 9:
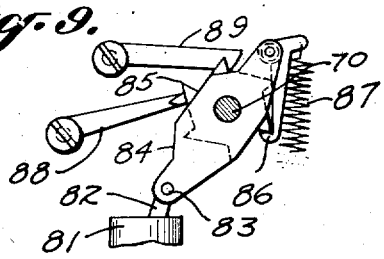
Fig. 9 is a diagram of the ratchet mechanism.
Figure 7:
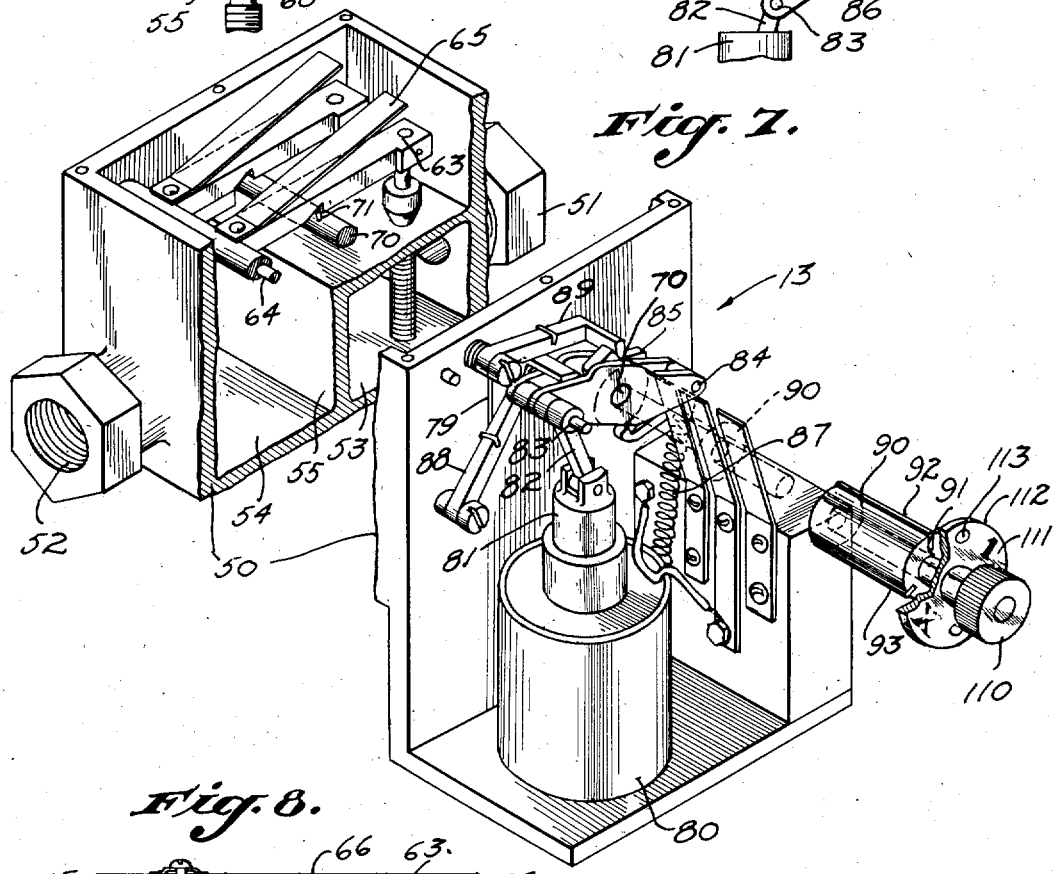
Fig. 7 is a perspective view of the valve mechanism, this mechanism being broken away and separated to better illustrate its structure.
Figure 8:
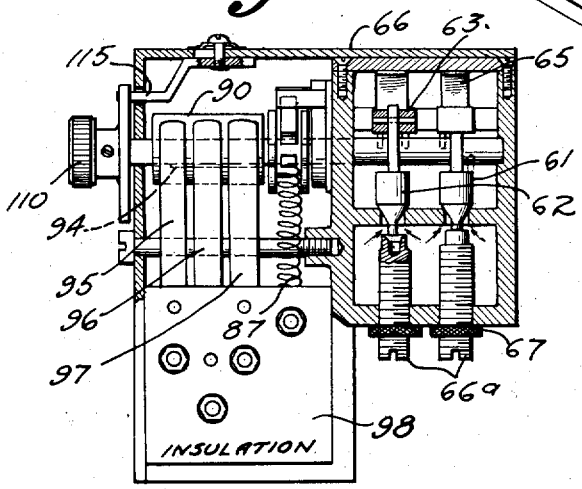
Fig. 8 is a section through the mechanism shown in Fig. 7.

The valve 13 is illustrated in Figs. 7, 8, 9 and 10 and preferably consists of a brass casting 50 having an inlet opening formed in an extension 51 and an outlet opening formed in an extension 52. Gas pipes may be connected into the extensions 51 and 52. The inlet opening communicates with an inlet chamber 53 and the outlet opening communicates with an outlet chamber 54. These chambers are separated by a wall 55 having two openings 60 therein, as shown in Fig. 10. Small poppets 61 and 62 are provided for closing the upper end of these openings. These poppets are carried on lever arms 63 pivoted on a pin 64, the poppets being forced downwardly by flat spring 65 which press against a cover 66 secured on the casting 50. The amount of gas passing through the openings 60 is regulated by means of screws 66ª having lock nuts 67. By forcing the screws 66ª up or down, the amount of gas which will pass through either of the opening 60 may be regulated, and thus the amount of flame with either poppet open can be regulated.

The poppets 61 or 62 are operated by a shaft 70 having pins 71 thereon, these pins cooperating with under faces of the lever arm 63 to raise the poppets against the action of the springs 65. Notches 72 are formed in the lever arms 63, receiving the pins 71 to allow the poppets to seat when the shaft 70 passes certain points in its rotation. The pins 71 are so placed that the proper sequence of operation of the poppets 61 and 62 is secured, as will hereinafter be explained. The shaft 70 is turned through predetermined angular distances to lift either or both of the poppets, as will hereinafter be explained, this turning being accomplished by a single magnet coil 80 which attracts a magnet plunger 81. The plunger 81 is connected through a connecting rod 82 with a pin 83 of a beam 84 which is free to turn on the shaft 70. Rigidly secured to the shaft 70 is a ratchet wheel 85. This ratchet wheel is advanced by means of a pulling dog 86 carried on the beam 84, the beam 84 being normally held in the position shown in Fig. 7 by means of the spring 87. When the coil 80 is energized, the core 81 moves from the "off" position shown in Fig. 7 into the position shown in Fig. 9, thus rotating the shaft 70 in a counter-clockwise direction. The exact degree of this rotation is governed by a stop pawl 88 and any rotation of the ratchet wheel 85 in the opposite direction is prevented by a check pawl 89. A suitable spring 79 forces the pawls 89 and 88 into engagement with the wheel 85. A projection on the beam 84 lifts the pawl 88 out of engagement with the ratchet wheel 85 when the core 81 moves into the "off" position shown in Fig. 7.

It will be evident that each downward movement of the core 81 working through the beam 84 and the pawls 86, 88 and 89 tends to turn the shaft through a certain predetermined distance. The teeth of the ratchet wheel 85 are so spaced the pins 71 are so placed that in what may be called the "off" position neither of the pins 71 engage the levers 63 and both of the poppets 61 and 62 are solidly seated, cutting off all flow of gas to the heater 11.

The first actuation of the plunger 81 then turns the shaft 70 through such a distance that the poppet 61 is lifted from its seat. On the next actuation of the plunger 81 this poppet may be seated, thus turning off the supply of gas to the heater. On the next actuation the poppet 62 is lifted, thus giving what may be termed a medium heat. The next actuation preferably seats both poppets, thus turning off the supply of heat. The next actuation lifts both poppets, thus giving a maximum flow of gas and the succeeding and last movement again closes both poppets, thus providing for no supply of gas to the heater. It will thus be seen that the valve 13 is moved by means of the plunger 81 successively to an "off" position, to a "low" position, to an "off" position, to a "medium" position, to an "off" position, to a "high" position, and to an "off" position. There are three positions corresponding to three degrees of heat and three intermediate positions corresponding to no heat.

It is to be understood that while we consider this a preferable and desirable arrangement, we do not wish to be limited to this particular sequence of operation.

Figure 2:
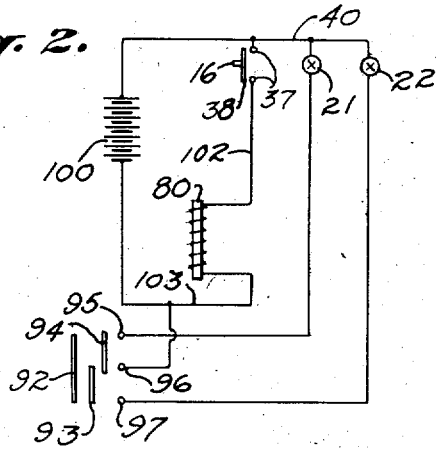
Fig. 2 is a diagram of connections.
Figure 3:
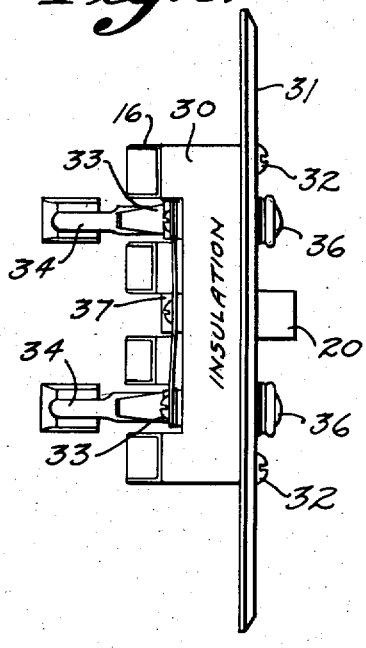
Fig. 3 is a side elevation of the push button switch.
Figure 4:
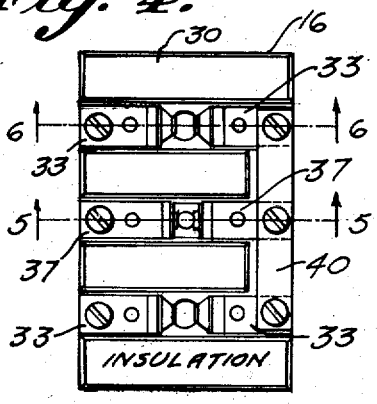
Fig. 4 is a back view of the push button switch.
Figure 5:
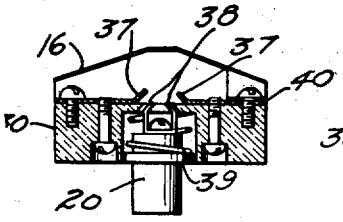
Fig. 5 is a section on a plane indicated by the line 5—5 of Fig. 4.
Figure 6:
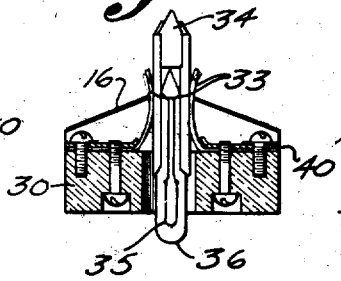
Fig. 6 is a section on a plane indicated by the line 6—6 of Fig. 4.

For the purpose of indicating to the user of the heater the exact condition of the valve 13, and of the fire in the heater, we provide a commutator 90 which comprises a piece of insulating material 91 carrying three strips of metal 92, 93 and 94. These strips contact with fingers 95, 96 and 97 which are carried on an insulating member 98 carried on the casting 50. The member 90 is solidly fastened on the shaft 70 and turns therewith. This member serves to energize the lights 21 and 22 by means of a connection shown in Fig. 2 in which 100 is a battery which is connected at its positive terminal through a wire 101 with the strip 40 in the switch 16. This connects the positive side of the battery to each of the lights 21 and 22 and to one of the contacts 37. The other contact 37 is connected to one terminal of the coil 80, which, in turn, is connected by a wire 103 with the negative side of the battery. It is thus evident that by pushing upon the push button 20 the contact 38 closes the circuit to the coil 80. The finger 96 is connected to the negative side of the battery and the fingers 95 and 97 are connected to the lights 21 and 22 respectively. It is evident that the strip 94 connects the lamp 21 in circuit, that the strip 93 connects the lamp 22 in circuit, and that the strip 92 connects both lamps in circuit. These strips 92, 93 and 94 make contact with the fingers 95, 96 and 97 on the "high", "intermediate" and "low" positions of the valve 13. The operator can thus tell by looking at the lights 21 and 22 whether the poppet 61 or the poppet 62 or both poppets or neither poppet is open.

In practical operation, the "low" light indicates a low degree of heat, the "high" light indicates a medium degree of heat, and both lights indicate the greatest degree of heat.

For the purpose of making it possible to operate manually at the furnace when it is desired to observe the operation, or to adjust the screws 66[a], a knurled knob 110 is provided on the end of the shaft 70 outside the cover 66, this knob having arbitrary figures 111 which indicate the position of the poppets 61 and 62. The knurled knob is provided with a flange 112 having a hole 113 therein. A sliding bolt 115 is provided in the cover 66, this bolt being adapted to be pushed out into the hole 113 and thus mechanically lock the shaft 70 against movement. The hole 113 is so placed that this locking can only take place when both of the poppets 61 and 62 are seated.

When, for any reason, it is desired to shut the furnace down, as for example, during the summer months, the bolt 115 is moved to positively lock the shaft 70 and prevent the gas from being turned on accidently or maliciously when the householder does not need it.

It will be seen that our invention provides a ready means for controlling a gas heater, the operator being able to obtain three degrees of heat from a point at a distance from the heater, and particularly at the point at which the heat is being used. In practice, the switch 16 is located at some convenient point where it indicates the condition of the furnace at a glance due to the lights 21 and 22.

We claim as our invention:

1. In a heating system, the combination of: a gas heater; valve means controlling the flow of gas to said heater, said means being adapted to assume a low position, admitting a relatively small flow of gas to said heater, or a high position, admitting a relatively large flow of gas to said heater, or a position intermediate the low and high positions, or an "off" position, entirely shutting off the flow of gas to said heater; means by which a person at a point remote from said heater may cause said valve to assume any one of said positions; and means independent of said last named means for differently indicating to a person remote from said heater every position of said valve.

2. In a heating system, the combination of: a gas heater; valve means controlling the flow of gas to said heater, said means being adapted to assume a low position, admitting a relatively small flow of gas to said heater, or a high position, admitting a relatively large flow of gas to said heater, or a position intermediate the low and high positions, or an off position, entirely shutting off the flow of gas to said heater; contacts controlled by the position of said valve means; electro-responsive means, remote from the heater, for differently indicating to a person, remote from the heater, every position of said valve means; electric conductors connecting said contacts with said electro-responsive means; and means by which a person at a point remote from said heater may cause said valve to assume any one of said positions.

3. In a heating system, the combination of: a gas heater; valve means controlling the flow of gas to said heater, said means being adapted to assume a low position, admitting a relatively small flow of gas to said heater, or a high position, admitting a relatively large flow of gas to said heater, or a position intermediate the low and high positions, or an off position, entirely shutting off the flow of gas to said heater; contacts controlled by the position of said valve means; electro-responsive means, remote from the heater, for differently indicating to a person, remote from the heater, every position of said valve means; electric conductors connecting said contacts with said electro-responsive means; electrically operated means; step-by-step mechanism by which said electrically operated means successively moves said valve means from one position to another, each step serving to move said valve from a closed position to one of its open positions or vice versa; and means by which a person, remote from said heater, may energize said electrically operated means.

4. In a valve: walls forming a chamber, a partition wall dividing said chamber into an inlet chamber and an outlet chamber, said partition wall having a plurality of apertures therethrough; a plurality of poppets adapted to close said apertures; and lever arms on which said poppets are pivotally mounted, said lever arms being pivotally mounted.

5. In a valve: walls forming a chamber, a partition wall dividing said chamber into an inlet chamber and an outlet chamber, said partition wall having a plurality of apertures therethrough; a plurality of poppets adapted to close said apertures; adjustable means for regulating the flow of fluid from said inlet chamber through said apertures; and lever arms on which said poppets are pivotally mounted, said lever arms being pivotally mounted.

6. In a valve: walls forming a chamber, a partition wall dividing said chamber into an inlet chamber and an outlet chamber, said partition wall having a plurality of apertures therethrough; a plurality of poppets adapted to close said apertures; lever arms on which said poppets are pivotally mounted, said lever arms being pivotally mounted; and means tending to hold said poppets seated.

7. In a valve: walls forming a chamber, a partition wall dividing said chamber into an inlet chamber and an outlet chamber, said partition wall having a plurality of apertures therethrough; a plurality of poppets adapted to close said apertures; lever arms on which said poppets are pivotally mounted, said lever arms being pivotally mounted; means tending to hold said poppets seated, said lever arms having notches cut therein; a shaft; and pins extending radially from said shaft and adapted to engage said lever arms to unseat said poppets when said shaft is rotated and to be received in said notches to allow said poppets to seat when said shaft is further rotated, said pins being so disposed that any one, or any combination, of said poppets may be unseated.

8. In a valve: walls forming a chamber, a partition wall dividing said chamber into an inlet chamber and an outlet chamber, said partition wall having a plurality of apertures therethrough; a plurality of poppets adapted to close said apertures; adjustable means for regulating the flow of fluid from said inlet chamber through said apertures; lever arms on which said poppets are pivotally mounted, said levers arms being pivotally mounted, said lever arms having notches cut therein; a shaft; and pins extending radially from said shaft and adapted to engage said lever arms to unseat said poppets when said shaft is rotated and to be received in said notches to allow said poppets to seat when said shaft is further rotated, said pins being so disposed that any one, or any combination, of said poppets may be unseated.

9. In a valve: walls forming a chamber, a partition wall dividing said chamber into an inlet chamber and an outlet chamber, said partition wall having a plurality of apertures therethrough; a plurality of poppets adapted to close said apertures; lever arms on which said poppets are pivotally mounted, said lever arms being pivotally mounted; means tending to hold said poppets seated, said lever arms having notches cut therein; a shaft; pins extending radially from said shaft and adapted to engage said lever arms to unseat said poppets when said shaft is rotated and to be received in said notches to allow said poppets to seat when said shaft is further rotated, said pins being so disposed that any one, or any combination, of said poppets may be unseated; a beam mounted on said shaft and free to turn thereon; a pulling dog secured to said beam; a ratchet wheel fixedly mounted on said shaft and adapted to be engaged by said dog; a stop pawl adapted to engage said ratchet wheel; and means tending to keep said stop pawl in engagement with said ratchet wheel, said lever being formed to disengage said stop pawl from said ratchet wheel.

10. In a valve: walls forming a chamber, a partition wall dividing said chamber into an inlet chamber and an outlet chamber, said partition wall having a plurality of apertures therethrough; a plurality of poppets adapted to close said apertures; lever arms on which said poppets are pivotally mounted, said lever arms being pivotally mounted; means tending to hold said poppets seated, said lever arms having notches cut therein; a shaft; pins extending radially from said shaft and adapted to engage said lever arms to unseat said poppets when said shaft is rotated and to be received in said notches to allow said poppets to seat when said shaft is further rotated, said pins being so disposed that any one, or any combination, of said poppets may be unseated; a beam mounted on said shaft and free to turn thereon; a pulling dog secured to said beam; a ratchet wheel fixedly mounted on said shaft and adapted to be engaged by said dog; a stop pawl adapted to engage said ratchet wheel; means tending to keep said stop pawl in engagement with said ratchet wheel, said lever being formed to disengage said stop pawl from said ratchet wheel; a plunger pivotally mounted on said beam; a solenoid in which said plunger moves reciprocally; and means tending to keep said plunger in "out" position with relation to said solenoid, and electrical circuits, including said solenoid, for drawing said plunger into said solenoid, thus to rotate said shaft.

11. In a valve: walls forming a chamber, a partition wall dividing said chamber into an inlet chamber and an outlet chamber, said partition wall having a plurality of apertures therethrough; a plurality of poppets adapted to close said apertures; lever arms on which said poppets are pivotally mounted, said lever arms being pivotally mounted; means tending to hold said poppets seated, said lever arms having notches cut therein; a shaft; pins extending radially from said shaft and adapted to engage said lever arms to unseat said poppets when said shaft is rotated and to be received in said notches to allow said poppets to seat when said shaft is further rotated, said pins being so disposed that any one, or any combination, of said poppets may be unseated; a beam mounted on said shaft and free to turn thereon; a pulling dog secured to said beam; a ratchet wheel fixedly mounted on said shaft and adapted to be engaged by said dog; a stop pawl adapted to engage said ratchet wheel; means tending to keep said stop pawl in engagement with said ratchet wheel, said lever being formed to disengage said stop pawl from said ratchet wheel; a plunger pivotally mounted on said beam; a solenoid in which said plunger moves reciprocally; means tending to keep said plunger in "out" position with relation to said solenoid, and electrical circuits, including said solenoid, for drawing said plunger into said solenoid, thus to rotate said shaft; and electrical means for indicating the positions of said poppets.

12. In a heating system, the combination of: a gas heater; valve means controlling the flow of gas to said heater, said means being adapted to assume a low position, admitting a relatively small flow of gas to said heater, or a high position, admitting a relatively large flow of gas to said heater, or an off position, entirely shutting off the flow of gas to said heater; contacts controlled by the position of said valve means; electro-responsive means, remote from the heater, for differently indicating to a person, remote from the heater, every position of said valve means; electric conductors connecting said contacts with said electro-responsive means; electrically operated means; step-by-step mechanism by which said electrically operated means successively moves said valve means from one position to another, each step serving to move said valve from a closed position to one of its open positions or vice versa; and means by which a person, remote from said heater, may energize said electrically operated means.

13. The combination of: valve means adapted to control the flow of a fluid, said means being adapted to assume a low position, at which it may pass a relatively small flow of fluid, or a high position, at which it may pass a relatively large flow of fluid, or an "off" position, at which the flow of fluid may be entirely shut off; contacts controlled by the position of said valve means; electro-responsive means, remote from said valve means, for differently indicating to a person, remote from said valve means, every position of said valve means; electric conductors connecting said contacts with said electro-responsive means; electrically operated means; step-by-step mechanism by which said electrically operated means successively moves said valve means from one position to another, each step serving to move said valve from a closed position to one of its open positions or vice versa; and means by which a person, remote from said valve means, may energize said electrically operated means.

In testimony whereof, we have signed our names to this specification.

FRANCIS W. OBENHAUS.
GEORGE R. ADAMS.